Dec. 18, 1951     R. L. EDENS     2,579,179
CLUTCH PLATE SHIM
Filed Oct. 28, 1948
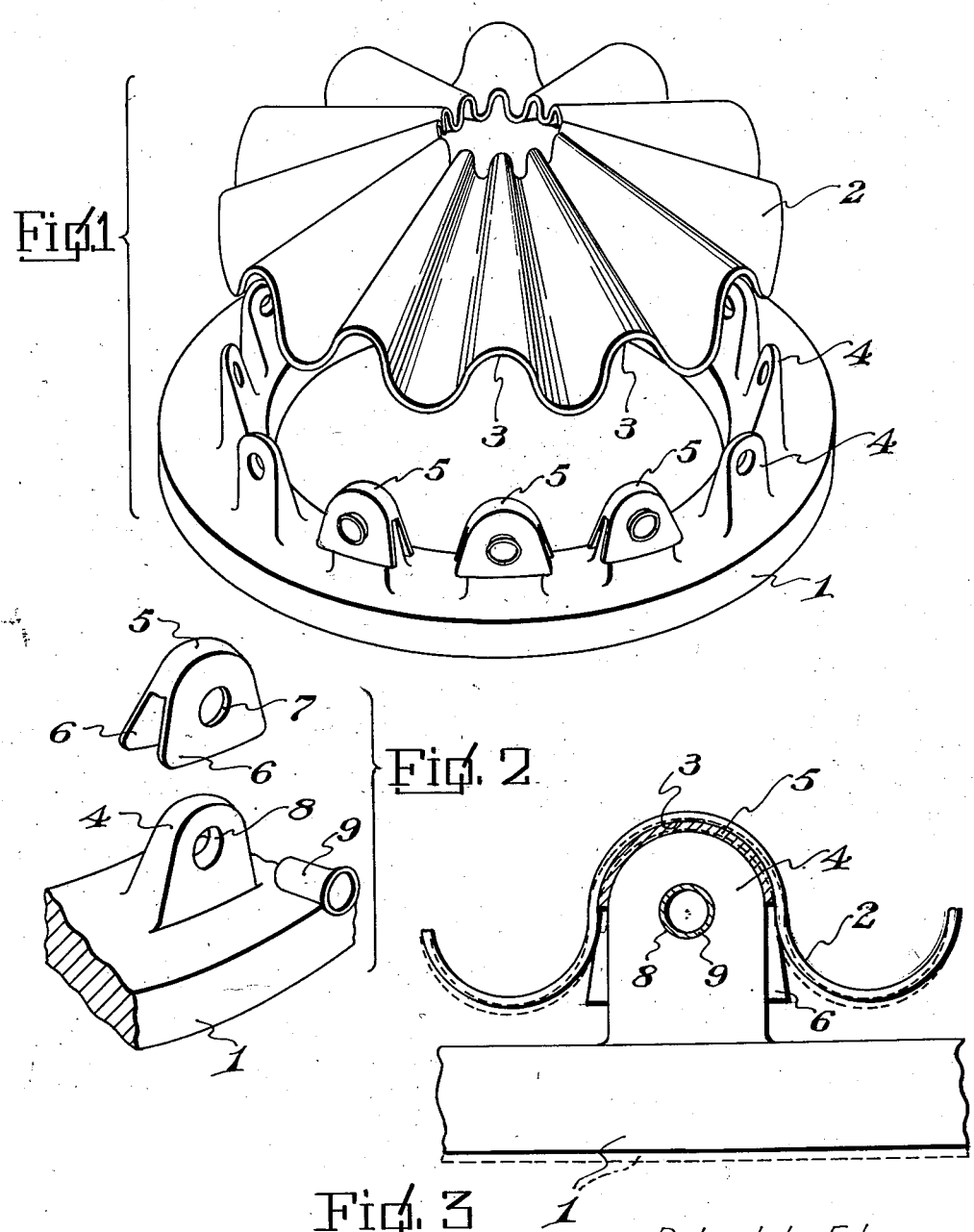
Robert L. Edens
INVENTOR.
BY *Philip A. Terrell*
ATTORNEYS.

Patented Dec. 18, 1951

2,579,179

UNITED STATES PATENT OFFICE 2,579,179

CLUTCH PLATE SHIM

Robert L. Edens, Tulsa, Okla.

Application October 28, 1948, Serial No. 57,102

1 Claim. (Cl. 192—111)

The invention relates to shims and particularly to shims received on the ends of projections of clutch plates, which projections are received in valleys, radially disposed on a wave spring, and has for its object to provide cup shaped shims which can be placed over any of the plate projections for compensating for the wear in any of the valleys of the wave spring, or inaccuracies in the projection ring.

A further object is to provide a clutch wave spring shim conforming to the shape of the plate projections to snugly fit the same, and having apertured flanges positioned to register with the projection apertures for the reception of the usual spring sleeves which pass through the projections.

A further object is to provide a clutch wave spring shim for travel in the wave spring valleys, and adapted to compensate for wear of the projections or valleys.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a collective perspective view of the wave spring and projection plate.

Figure 2 is a collective detail perspective view of one of the shims, a lug and the sleeve, showing the parts in position to be assembled.

Figure 3 is a transverse sectional view of one of the waves of the wave spring, and the shim on the projection.

Referring to the drawing, the numeral I designates a projection ring of a conventional form of clutch, and 2 the wave spring. The wave spring 2 is provided with projection receiving valleys 3, radially disposed on its inner side and in which the concentrically arranged lugs 4 of the ring I engage as the wave spring is flexed axially during a clutching operation. It has been found that the valleys 3 of the wave spring and the ends of the lugs 4 wear, and it has been the practice to renew the spring or the projection plate I. This is an expensive operation, and to overcome this disadvantage cup shaped shims 5 are provided which engage over the projections 4, clearly shown in Figure 3.

Shims 5 are provided with opposite flanges 6 having apertures 7 therein which register with the apertures 8 in the lugs 4. The apertures 8 are standard and usually have spring receiving sleeves 9 therein. It will be seen, after the shims 5 have been placed on the desired lugs 4, the sleeves 9 can be passed through the registering apertures 7 and 8 and the shims will be held in position.

The shims 5 are preferably stamped from different gage material so that different thicknesses may be selected for different lugs according to the wear. In some cases the misalinement is caused by the inaccuracies on the outer face of the projection ring.

The device is particularly adapted for use in connection with the Buick type of clutch, however it is to be understood it can be used in connection with any type of clutch which uses a wave spring cooperating with rigid lugs.

The invention having been set forth, what is claimed as new and useful is:

The combination with a clutch projection ring, a projection carried by said ring, said projection being arcuately shaped at its outer end and its sides flat and diverging, the inner and outer sides of said projection being flat and the projection apertured, a shim fitting said projection, said shim being cup shaped and conforming to the shape of the projection, said shim having front and rear walls angularly conforming to the angularity of the inner and outer sides of projection and provided with apertures registering with the aperture in the projection and securing means extending through said registering apertures.

ROBERT L. EDENS.

REFERENCES CITED

The following references are of record in the file of this patent:

UNITED STATES PATENTS

| Number | Name | Date |
|---|---|---|
| 748,569 | Anderson | Jan. 5, 1904 |
| 1,033,397 | Hauquitz | July 23, 1912 |
| 1,235,428 | Bristol et al. | July 31, 1917 |
| 1,313,317 | Michaud | Aug. 19, 1919 |
| 1,370,268 | Lauth | Oct. 9, 1923 |
| 1,485,319 | Wemp | Feb. 26, 1924 |
| 1,520,967 | Rothweiler | Dec. 30, 1924 |
| 1,644,548 | Spase | Oct. 4, 1927 |
| 2,064,450 | Space | Dec. 15, 1936 |
| 2,229,910 | Adamson | Jan. 28, 1941 |
| 2,246,231 | Almen | June 17, 1941 |
| 2,501,057 | Kelleher | Mar. 21, 1950 |